April 16, 1963  R. B. NICHOLS  3,085,924
METHOD OF TIRE BALANCING
Filed Nov. 19, 1957

INVENTOR.
RAYMOND B. NICHOLS
BY
*R. L. Miller*
ATTORNEY

3,085,924
METHOD OF TIRE BALANCING
Raymond B. Nichols, Akron, Ohio, assignor to The Goodyear Tire & Rubber Company, Akron, Ohio, a corporation of Ohio
Filed Nov. 19, 1957, Ser. No. 697,376
10 Claims. (Cl. 156—75)

This invention relates to the repair of elastomeric articles and particularly to the preparation of tires for balancing or repairs to the interior surface thereof.

In the manufacture of tires in conventional vulcanization molds where inflatable curing bags are used to form the tires in the molds, it is common practice to cover the interior of the tire carcass with a liner coating whose function it is to prevent the air bag from sticking to the interior surface of the tire during the curing operation. After cure is completed, it is occasionally found that the surface of the tire interior is slightly defective, necessitating repairs. More frequently, the cured tire is out of balance which must be corrected. One of the more common examples of the former condition is that the air retaining liner which seals the interior chamber of a tubeless tire fails to cover the entire surface of the tire and, hence, will fail to retain the air in the tire. The latter situation, that of unbalance, may occur with any type tire but is particularly critical in aircraft tires since they are required to endure extremely high speed service during which a slight unbalance may result in a dangerous shimmy or wobble in the aircraft wheels with possible loss of control during landing or take-off. Where the liner of a tubeless tire is defective or fails to cover the entire interior, additional liner compound must be applied and cured to the tire. In order to bring a tire into balance, so-called balance dough, an elastomeric material primarly compounded for weight factor, is applied to the light portion of the tire. Of course, since the liner coating on the tire interior is a material chosen for its non-adhesive qualities, balance dough and liner compound will not adhere to it properly and therefore the liner coating must be completely removed in the area to be repaired. If this is not done, improper adhesion of the balance dough or liner compound to the tire will result which presents a dangerous condition since the balance dough or liner compound may be suddenly torn from the tire due to centrifugal or flex forces and cause sudden loss of control of the vehicle due to wheel wobble. In addition, the loss of the added liner compound may impair the air retention properties of the tire to the extent that it will deflate. However, the removal of the liner coating without substantial damage to the underlying tire carcass, particularly the air-retaining liner, has been both difficult and tedious with the methods previously used. Therefore, it is a primary object of the present invention to provide a method for removing extraneous matter from the surface of an elastomeric article, particularly a tire interior, without impairing the surface of the article underlying the matter to be removed.

It is an additional object of the present invention to provide a method for removing extraneous matter from the surface of a tire wherein the number of critical control factors such as depth of cut is reduced to a minimum.

It is a still further object of the present invention to provide a method for removing extraneous material from the surface of a tire in a rapid and economical manner.

These and other objects of the present invention will become apparent from the following description and drawings in which.

As previously mentioned, it is common practice in the vulcanization of tires and similar articles where internal inflatable curing tubes are utilized, to cover the interior surface of the tire with a liner coating to prevent the curing tube from sticking to the tire when subjected to the usual heat and pressure of the vulcanization process. When it is found necessary to repair the interior of a cured tire, this liner coating must be removed for reasons previously mentioned.

In the past, it has been the practice to remove the liner coating from a tire interior by means of a grinding wheel or similar apparatus. However, this approach has its difficulties, particularly in that it is extremely difficult to grind away the liner coating without removing some of the underlying material at the same time. Where the underlying material comprises the air retaining liner of a tubeless tire this is a critical and often dangerous effect since the liner may be no more than .060 inch in thickness and any loss of sealing material substantally affects its permeability. The sealing material ground away must, therefore, be replaced which adds to the cost of producing the tire. In addition, the use of a grinding wheel within the close confines of a tire carcass is cumbersome and in many cases almost impossible. Scraping the tire interior quite clearly gives rise to the same or similar problems as does the grinding technique. In addition, cutting the tire carcass is an ever present risk.

The use of a solvent for removal of the liner coating is also unsatisfactory due to the difficulty of providing a solvent which will not attack the tire as well as the coating and the need for a subsequent washing or cleaning step to assure removal of the material or any excess solvent. In addition, the depth of penetration of the solvent is most difficult to control.

Figure 1:
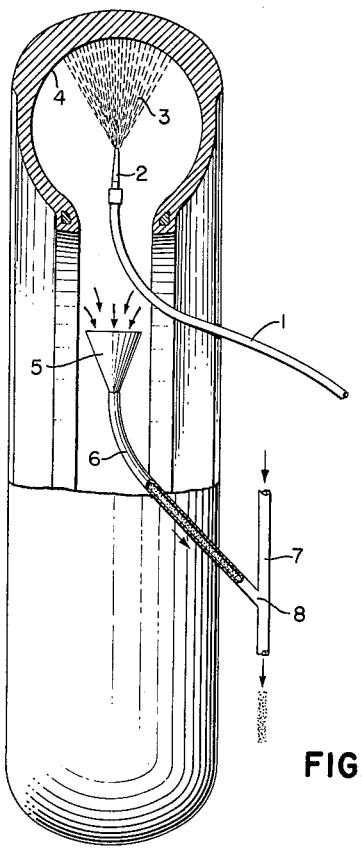
FIG. 1 is a simple schematic of an apparatus for practicing the present invention.

It has been discovered that foreign matter can be removed from the surface of an elastomeric article, particularly liner coating from a tire interior, without damage to the surface underlying the area to be treated, by blasting the area with a fine grit abrasive. A simple schematic of an apparatus for accomplishing this is shown in FIG. 1.

In that illustration, a flexible hose 1, having a nozzle 2 is used to direct an air stream 3 containing a fine grit abrasive against the interior of the tire 4 to remove the liner coating therefrom. The blasting equipment may be any of the well known types and forms no part of the present invention. An exhaust system to remove the grit and the liner coating from the tire chamber has been found to provide an efficient means for cleaning the tire in preparation for subsequent repairs. A simple exhaust system is illustrated in FIG. 1 and comprises a hood 5 attached to hose 6 which forms one leg of a Y hose system. The other leg 7 of the Y is fed by an air jet which is directed down the leg 7 in the direction of the arrows in the figure. Thus, according to the well known Bernoulli's principle, a partial vacuum is created in hose leg 6 by the air passing over the junction 8 of the leg 6 and leg 7. The pressure differential thus created draws the grit and removed liner coating down hose leg 6 to the junction 8 and out through leg 7 with the air jet to a suitable container (not shown) from which the grit can be reclaimed for reuse.

Figure 2:
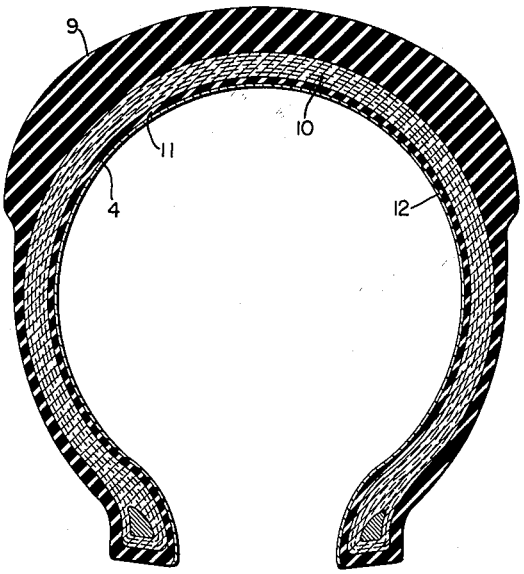
FIG. 2 is a section of a typical tubeless tire showing the composite structure with which the method of the present invention deals.

A consideration of the typical tubeless tire illustrated in FIG. 2 will aid in appreciating the problems involved and the advances of the present invention over the prior art. The tire in FIG. 2 has a tread or crown 9 having elastomer coated fabric reinforcing plies 10 embedded therein. A tire sealing liner 11 covers the interior of the tire and functions to prevent loss of air from the chamber by diffusion of air through the carcass of the tire and also prevents the collection of diffused air in the fabric layers 10 which might result in blisters and ply separation. A layer 12 of liner coating covers the liner 11 and, as previously mentioned, provides a non-sticky surface to prevent adherence of the curing tube used during the vulcanization process. The difficulty in completely removing the liner coating layer 12 without damaging the underlying liner 11 can be readily appreciated. The criticality of depth of cut where grinding or scraping is utilized to remove the coating is apparent since a slight error in one direction will result in damage to the liner, necessitating further repairs, while an error in the other direction results in failure to entirely remove the coating. The latter obviously is undesirable since balance dough or new liner compound will not adhere to the areas covered with liner coating because it is specially compounded to provide a surface to which other materials will not adhere.

It has been found that in practicing the present invention the grit blasting effectively removes the liner coating but that continued blasting of the area after the cement is removed has no appreciable effect on the elastomeric materials of the tire carcass and particularly the air retaining liner compound. Thus the danger of damage to the material underlying the coating is obviated while at the same time complete removal of the coating is assured in a minimum time.

As an example, the interior of a 26 x 6.6 tubeless aircraft tire was blasted for approximately 35 seconds which resulted in removal of the liner coating without damage to the air retaining liner. In many cases, of course, only a portion of a tire interior need be blasted resulting in a still smaller expenditure of time. It has been found that iron grit of #40 to #80 grit size, at least as fine as #40 being most effective, in an air jet operated at approximately 60–90 p.s.i.g., approximately 90 p.s.i.g. being preferred, gives excellent results. Grits coarser than #40 and pressures of less than 60 p.s.i.g. have been found to require a longer operating time and to result in some cases in incomplete removal of the cement. Fine grit of walnut shells also gives good results although the fine dust created during the blasting due to break up of the grit upon impact makes cleaning the tire interior somewhat more difficult. It has been found that an exhaust apparatus, such as described previously with reference to FIG. 1, operating at a vacuum of 16–18 inches of mercury will clean a tire in approximately 15 seconds where the cleaning process is commenced after the blasting is completed. Where the exhaust system is operated during the blasting a lesser time is required.

Figure 3:
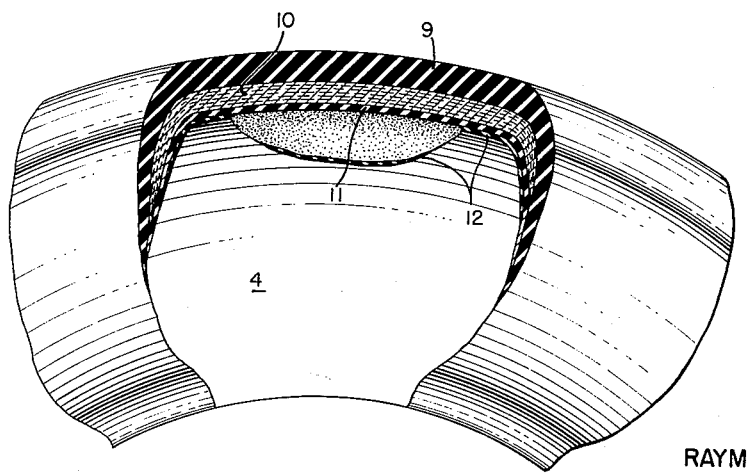
FIG. 3 is a partially cutaway section of a tubeless tire showing a typical result of the practice of the method of the present invention.

FIG. 3 illustrates the result of the practice of the method of the present invention on a tire of the type shown in FIG. 2. It can be seen that a portion of the liner coating layer 12 has been abraded away baring the sealing liner 11. As explained previously, the liner 11 is undamaged by the use of fine grit blasting. FIG. 3 illustrates the situation where a tire is being prepared for the application of balance dough. The blasted area represents the light portion of the tire to which weight is to be added by a coating of balance dough. In the case where the tire liner is to be repaired in an area of imperfection, the liner 11 would not be perfect as shown in FIG. 3, but have a defect which might expose the innermost elastomer coated fabric layer 10. However, the method of the present invention may still be used to remove the liner coating layer 12, since, as mentioned before, neither the liner nor the other portions of the tire are adversely affected by the fine grit blasting process.

In balancing a tire, it is necessary first to determine the location and degree of unbalance. Methods and apparatus for accomplishing this are well known in the art and any convenient approach may be taken. In practicing the method of the present invention, the light portion of the tire is determined in the relative sense and this area is then blasted with a fine grit abrasive to remove the liner cement and other undesirable matter adhered to that area. The area cleaned may be larger than necessary without adverse effects since the liner coating has served its purpose during the curing process and is no longer necessary for effective performance of the tire. The tire may be cleaned by an exhaust system or other suitable means either during the blasting operation or subsequent thereto as desired. Balance dough in sufficient quantity to bring the tire into balance is then applied to the blasted area. The method of the present invention may also be utilized to clean the interior surfaces of tires or other elastomeric articles as well as to prepare a tire for liner or other repairs, for example, the application of a patch or valve sealing pad to the interior of a tire.

While certain representative embodiments and details have been shown for the purpose of illustrating the invention, it will be apparent to those skilled in this art that various changes and modifications may be made therein without departing from the spirit or scope of the invention.

I claim:

1. The method of removing liner coating from at least a portion of the interior surface of a tire in preparation for repairing said tire comprising blasting the said portion of the tire interior with a fine grit abrasive to abrade the liner coating therefrom without inflicting substantial damage to the elastomeric surface underlying the liner coating on said portion.

2. The method according to claim 1 including providing an exhausting action in said tire to remove the abrasive and abraded liner coating from the tire interior.

3. The method according to claim 1 in which the said grit is at least as fine as #40 grit.

4. The method according to claim 1 in which the said grit blasting is accomplished with an air jet as the carrier for the grit and is operated at a pressure in the range of 60 to 90 p.s.i.g.

5. The method of balancing a tire having liner coating adhered to the interior surface thereof, comprising the steps of blasting the interior surface of said tire with a fine grit abrasive in the area corresponding with the light portion of the tire to abrade the liner coating therefrom without inflicting substantial damage to the portion of the tire underlying said area, and applying balance dough to the said area in sufficient amount to bring the tire into balance.

6. The method according to claim 5 including providing an exhausting action in the said tire to remove the abrasive and abraded liner coating from the tire interior.

7. The method according to claim 5 in which the said grit is at least as fine as #40 grit.

8. The method according to claim 5 in which the said grit blasting is accomplished with an air jet as the carrier for the grit and is operated in the pressure range of 60 to 90 p.s.i.g.

9. The method according to claim 6 in which the said grit is at least as fine as #40 grit.

10. The method according to claim 6 in which the said grit blasting is accomplished with an air jet as a carrier for the said grit and is operated in the pressure range of 60 to 90 p.s.i.g.

References Cited in the file of this patent

UNITED STATES PATENTS

| | | |
|---|---|---|
| 1,591,816 | Hawkinson | July 6, 1926 |
| 1,591,817 | Hawkinson | July 6, 1926 |
| 1,836,941 | Spicer | Dec. 15, 1931 |
| 1,977,386 | Holes | Oct. 16, 1934 |
| 2,080,227 | Periat | May 11, 1937 |
| 2,193,734 | MacCracken | Mar. 12, 1940 |
| 2,245,355 | Mullen | June 10, 1941 |
| 2,348,505 | Voerge | May 9, 1944 |
| 2,429,032 | Sheahan | Oct. 14, 1947 |
| 2,430,076 | Pollock | Nov. 4, 1947 |
| 2,479,299 | Biggs et al. | Aug. 16, 1949 |
| 2,628,456 | Berg | Feb. 17, 1953 |
| 2,651,887 | Graham | Sept. 15, 1953 |
| 2,805,699 | Reading | Sept. 10, 1957 |
| 2,876,601 | McFaddan | Mar. 10, 1959 |

OTHER REFERENCES

"Bell Laboratories Find Way to Recondition Typewriter Rollers," The C and P Call, State of Virginia, vol. XIII, No. 9, October 1942.